US012173787B2

(12) United States Patent
Fohrenkamm et al.

(10) Patent No.: US 12,173,787 B2
(45) Date of Patent: Dec. 24, 2024

(54) THROTTLE INPUT LIMITING SYSTEM

(71) Applicant: The Toro Company, Bloomington, MN (US)

(72) Inventors: Jeremy Fohrenkamm, Bloomington, MN (US); Nathan Wiater, Bloomington, MN (US); Ryan Foss, Bloomington, MN (US); Greg L. Lawrence, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 18/177,042

(22) Filed: Mar. 1, 2023

(65) Prior Publication Data

US 2023/0366458 A1 Nov. 16, 2023

Related U.S. Application Data

(60) Provisional application No. 63/364,704, filed on May 13, 2022.

(51) Int. Cl.
| | | |
|---|---|---|
| *F16H 59/68* | (2006.01) | |
| *F16H 59/02* | (2006.01) | |
| *F16H 59/04* | (2006.01) | |
| *F16H 63/50* | (2006.01) | |

(52) U.S. Cl.
CPC ....... *F16H 59/0204* (2013.01); *F16H 59/044* (2013.01); *F16H 59/68* (2013.01); *F16H 63/502* (2013.01); *F16H 2063/508* (2013.01)

(58) Field of Classification Search
CPC ... F16H 59/68; F16H 63/502; F16H 2063/508
See application file for complete search history.

(56) References Cited

U.S. PATENT DOCUMENTS

| 2013/0166161 A1* | 6/2013 | Minase | B60W 30/18 701/54 |
| 2013/0289839 A1* | 10/2013 | Iizuka | B60W 30/19 701/54 |
| 2019/0316532 A1* | 10/2019 | Houle | F02D 9/02 |

* cited by examiner

*Primary Examiner* — Charles A Fox
*Assistant Examiner* — Gregory T Prather
(74) *Attorney, Agent, or Firm* — Inskeep IP Group, Inc.

(57) ABSTRACT

A system and method are described to help ensure that gears contained within the transmission system are shifted to the correct position before the user can apply the throttle. An electronic control unit (ECU) is connected to a shift position sensor that measures a position of a shifting axle within the engine. If the shift position sensor provides measurement data indicating that the shifting assembly is rotationally positioned to engage a specific gear, the ECU allows the user actuated throttle input to control the throttle level of the engine. If the shift position sensor provides measurement data indicating that the shifting assembly is rotationally positioned in between positions that actuate specific gears (also known as a "dead zone"), the ECU prevents the user actuated throttle input from controlling the throttle level of the engine.

20 Claims, 5 Drawing Sheets

THROTTLE INPUT LIMITING SYSTEM

RELATED APPLICATIONS

This application claims benefit of and priority to U.S. Provisional Application Ser. No. 63/364,704 filed May 13, 2022 entitled Gear Position Sensor, which is hereby incorporated herein by reference in its entirety.

BACKGROUND OF THE INVENTION

The present invention pertains to the gear selection and subsequent gear shifting mechanism of a vehicle's transmission.

Most utility or sport recreational vehicles utilize a shift-by-wire system to control the selection of available gears in the transmission, as well as the shifting from one gear to the desired gear.

Use of the shift by wire control system utilizes electric or electro-mechanical systems to select and change gears. Prior to the implementation of shift by wire control systems, mechanical linkages between the gear shift actuators and gears controlled the gear selection and shifting or changing of gears.

Shift by wire control systems have considerable advantages over the traditional mechanical linkages. Such advantages include lighter weight, easier maintenance, and longevity.

While these shift by wire control systems have been well known in the art for some time, they are not without their faults. For example, if a user applies throttle too quickly after selecting a different gear, the gears may not have sufficient time to move into place. Gear shifting is a mechanical process that can occur quickly, but not instantaneously. Providing throttle to misaligned gears can cause damage, as well as generating an audible grinding noise. Such a phenomenon is commonly referred to as "gear grinding." This can particularly be the case in vehicles with continuously variable transmissions when shifting (e.g., forward, backward, neutral) at higher engine RPM. Due to the potential for damage to the gears, gear grinding is not a desired result. As a result, there exists a need to reduce the incidence of misaligned gears and increasing the longevity of the engine gears.

SUMMARY OF THE INVENTION

The present invention includes a system to help ensure that gears contained within the transmission system are shifted to the correct position before the user can apply the throttle.

In one example, an electronic control unit (ECU) or similar vehicle processor is connected to a shift position sensor that measures a position of a shifting axle within the engine. If the shift position sensor provides measurement data indicating that the shifting assembly is rotationally positioned to engage a specific gear, the ECU allows the user actuated throttle pedal to control the throttle level of the engine. If the shift position sensor provides measurement data indicating that the shifting assembly is rotationally positioned in between positions that actuate specific gears (also known as a "dead zone"), the ECU prevents the user actuated throttle pedal from controlling the throttle level of the engine. Additionally, if the shift position sensor provides measurement data indicating that the shifting axle is positioned in certain gears, such as neutral, the ECU may also prevent the user actuated throttle pedal from controlling the throttle level of the engine.

In some aspects, the techniques described herein relate to a transmission shifting system configured for use with a transmission of a vehicle, including: a transmission selector configured to shift between a plurality of gears for changing a desired power output between an engine and a drive shaft of the vehicle; a gear position sensor configured to sense and communicate via a gear input signal whether the transmission is 1) engaged with one of the plurality of gears or 2) disengaged and in a dead zone between one or more of the plurality of gears; and, an electronic control unit configured to receive a gear input signal from a shifter, receive the gear position signal from the gear position sensor; and receive an input throttle signal from a throttle input; wherein the electronic control unit is further configured to limit the input throttle signal from the throttle input to an engine of the transmission when the gear input signal from the gear position sensor indicates that the transmission is disengaged in the dead zone between the one or more of the plurality of gears.

In some aspects, the techniques described herein relate to a transmission shifting system, wherein the electronic control unit is configured to limit the input throttle signal from the throttle input to a minimum idle level or zero input throttle state.

In some aspects, the techniques described herein relate to a transmission shifting system, wherein the gear position sensor is a rotary position sensor that senses a rotational position of a component of a gear shifting assembly of the engine.

In some aspects, the techniques described herein relate to a transmission shifting system, wherein the transmission selector includes a shift selector cable connected to a lever; and wherein the lever is connected to the component of the gear shifting assembly so as to change the rotational position of the component.

In some aspects, the techniques described herein relate to a transmission shifting system, wherein the electronic control unit measures an analog voltage from the gear position sensor and compares the analog voltage to a plurality of predetermined voltage ranges corresponding to dead zones.

In some aspects, the techniques described herein relate to a transmission shifting system, wherein the electronic control unit is configured to limit the input throttle signal from the throttle input when the throttle input is shifted to neutral.

In some aspects, the techniques described herein relate to a transmission shifting system, wherein the engine is configured for shift by wire, throttle by wire, and/or a continuously variable transmission.

In some aspects, the techniques described herein relate to an electronic control unit for a vehicle, wherein the electronic control unit is configured execute software to perform the following: receive a gear input signal from a gear position sensor of a transmission; receive an input throttle signal from a throttle with a controller; and, limit a power output of an engine connected to the transmission if the gear input signal indicates that the transmission is disengaged with one of a plurality of gears of the transmission.

In some aspects, the techniques described herein relate to an electronic control unit, wherein the electronic control unit is further configured to limit the power output of the engine to a minimum idle level or zero input throttle state.

In some aspects, the techniques described herein relate to an electronic control unit, wherein the electronic control unit is further configured to limit the power output of the engine if the gear input signal indicates that the transmission is in neutral.

In some aspects, the techniques described herein relate to an electronic control unit, wherein the electronic control unit is further configured to limit the power output of the engine if the gear input signal indicates that the transmission is in a dead zone between gears.

In some aspects, the techniques described herein relate to a method of shifting a transmission of a vehicle, including: receiving a gear input signal from a gear position sensor of a transmission with a controller; receiving an input throttle signal from a throttle with a controller; and, limiting a power output of an engine connected to the transmission if the gear input signal if the gear input signal indicates that the transmission is disengaged with one of a plurality of gears of the transmission.

In some aspects, the techniques described herein relate to a method 12, wherein the power output of the input of the engine is zero.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIG. 6 is a chart showing example rotational positions of a shifting assembly and gears certain positions correspond to.

DESCRIPTION OF EMBODIMENTS

Figure 1:
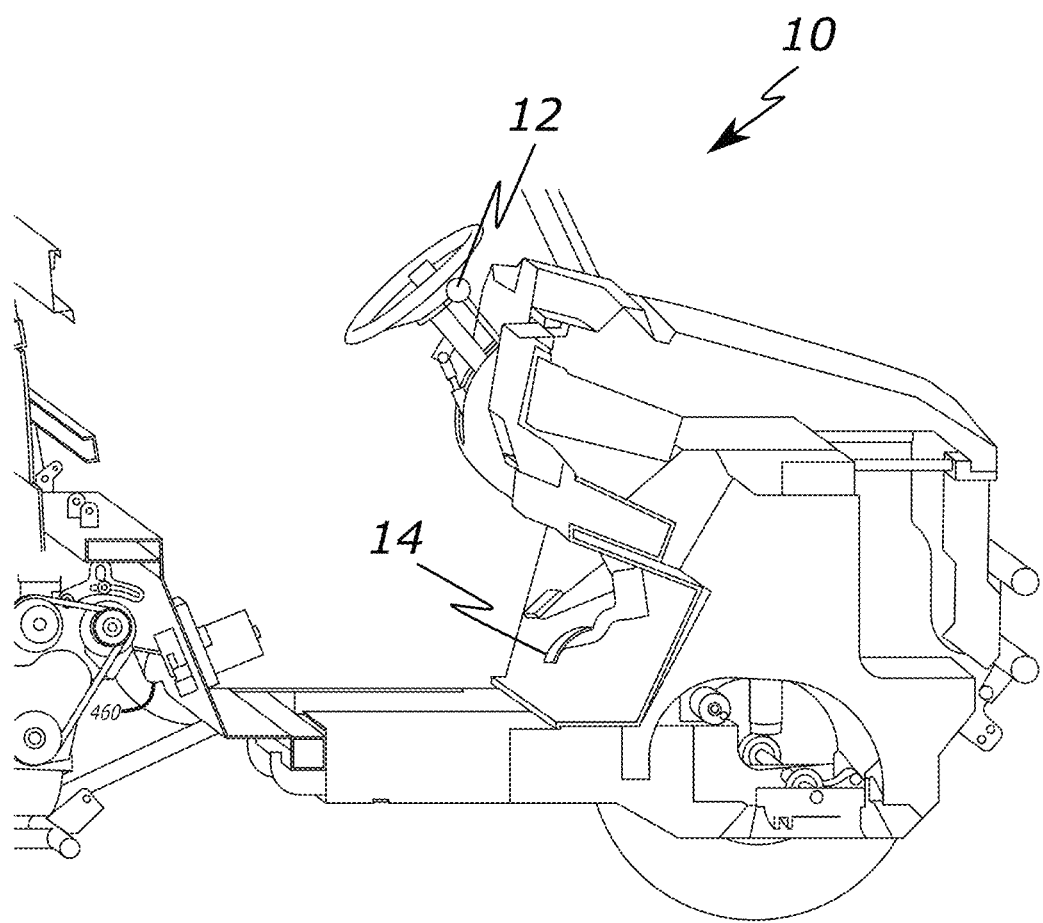
FIG. 1 is a partial view of a vehicle.
Figure 2:
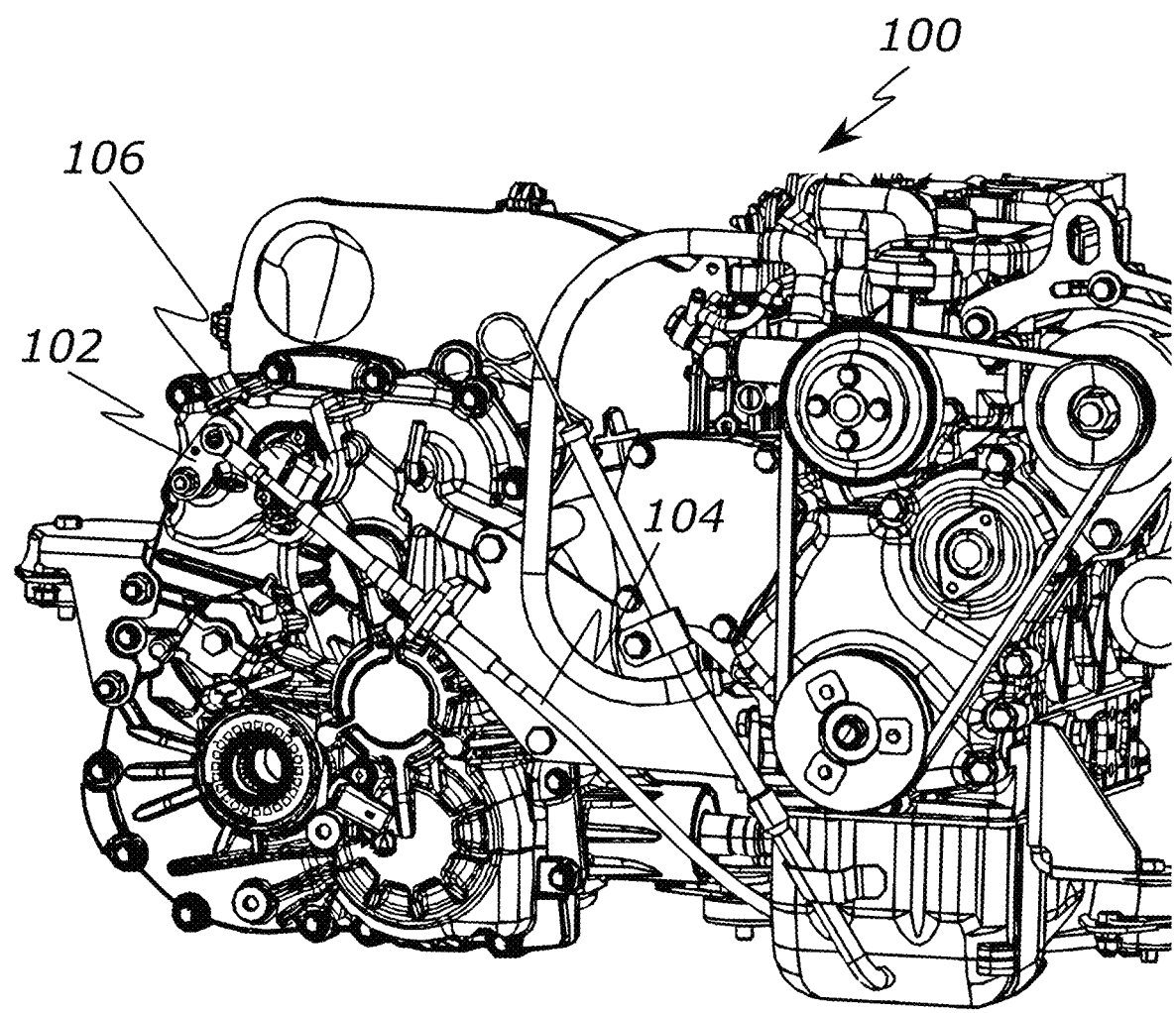
FIG. 2 is a partial view of an engine of a vehicle.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Generally, the present invention is directed to a system and method of limiting throttle usage by a user of a vehicle when a transmission of the vehicle is not engaged with a drive gear. By preventing or limiting the user from increasing the throttle when the shifting mechanism is between gears (i.e., in a "dead zone"), the transmission gears can be prevented from grinding and otherwise causing damage. In one embodiment, this can be achieved by monitoring sensor data from a shift position sensor, determining if the transmission is in a physical position corresponding to either 1) being engaged with a drive gear or 2) being disengaged from a drive gear and within a "dead zone", and preventing throttle input from a user if the gear selector lever is disengaged from a drive gear.

FIG. 1 illustrates a partial view of a vehicle 10 that includes a transmission selector 12 (e.g., a lever) and a throttle input 14 (e.g., a pedal). An ECU 108 is in electronic communication with the transmission selector 12 and the throttle input 14 (e.g., by sensors connected to each) such that each of their positions are constantly monitored during operation of the vehicle 10 (or alternatively that any changes in positioned are immediately registered). If the user changes a position of the throttle input 14 (e.g., pressing on the pedal), the ECU 108 receives the position change data and, if appropriate, controls the throttle level of the engine 100 via an appropriate amount. Similarly, if the user changes a position of the transmission selector 12, the ECU 108 receives the position change data and, if appropriate adjusts the shifting assembly 102 of the engine 100 to an appropriate position to engage a drive gear (e.g., forward, reverse, stop). In one example, the throttle changes and shifting changes are performed by motors on the engine itself as directed by the ECU.

Figure 3:
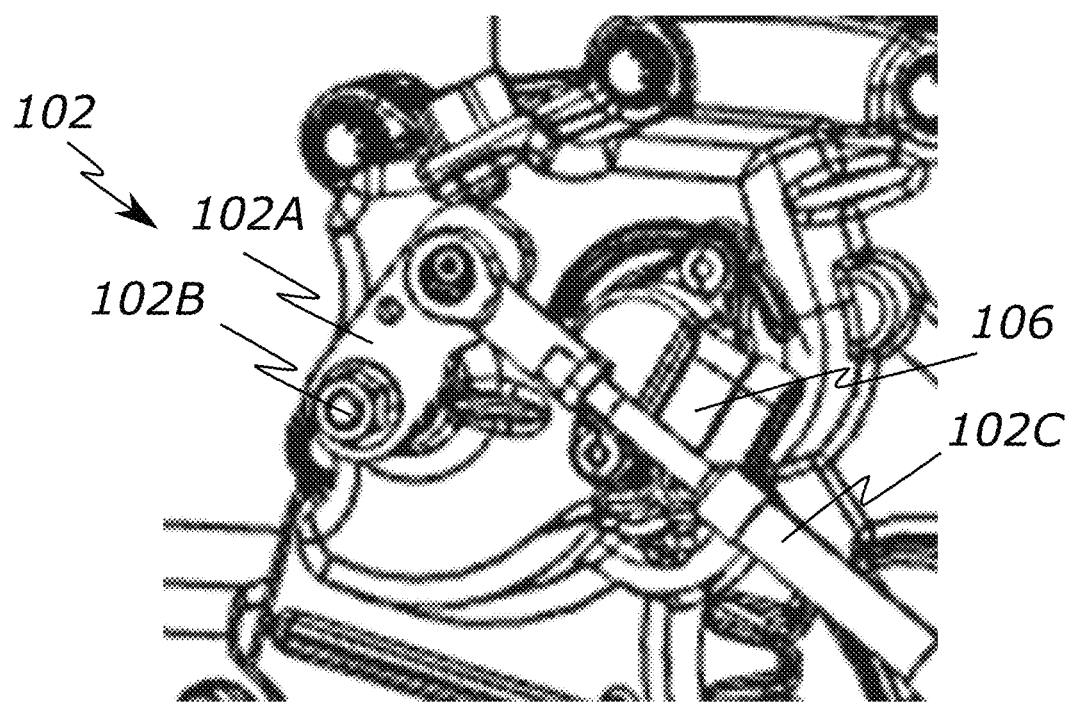
FIG. 3 is a magnified view of the engine of FIG. 2.
Figure 4:
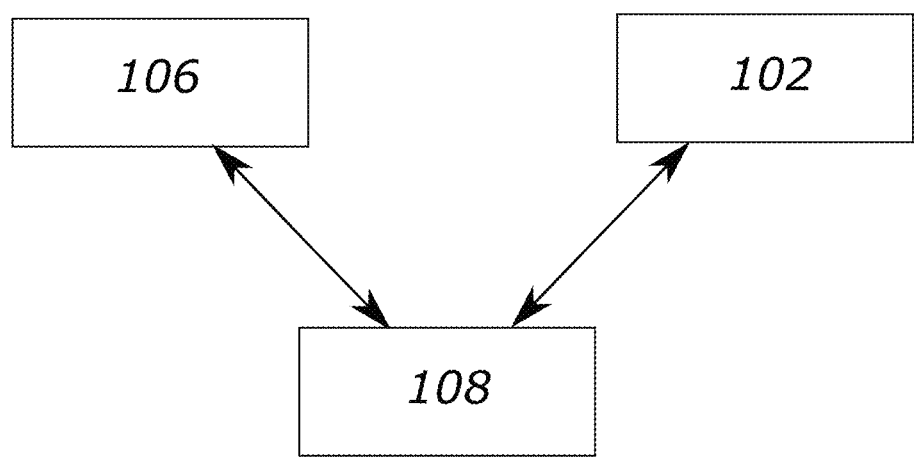
FIG. 4 is chart depicting ECU interaction with a gear position sensor and an engine throttle assembly.

FIGS. 3 and 4 illustrate an example of an engine 100 according to the present invention, having a gear shifting assembly 102 configured to shift the engine between a plurality of gears for changing the desired power output between the engine and the vehicle drives shaft or wheels. In one example, the gear shifting assembly 102 includes a shift selector cable 102C that is connected to a gear selector lever 102A. The shift selector cable 102C may be connected to a motor or similar mechanism controlled by the ECU 108, which causes the shift collector cable 102C to move the gear selector lever 102A. The gear selector lever 102A may be connected to a shaft or axle 102B that adjusts other components within the engine (e.g., gear selector drum) to move between different direction gears (e.g., forward, backward, neutral).

The engine 100 also may include a gear position sensor 106 that monitors a position of one or more components of the gear shifting assembly 102 (e.g., the gear drum, axle 102B, or lever 102A). The gear position sensor 106 may also be connected to and in electrical communication with the ECU 108 such that the ECU 108 receives data (e.g., analogue voltage values or digital data) corresponding to a rotational position of the gear shifting assembly component. Hence, the ECU 108 monitors and is aware of the position of the gear shifting assembly 102 and therefore what drive gear the engine should be in. In one example, the gear position sensor 106 is a rotary position sensor, as is known in the art.

It should be understood that the ECU 108 may include a processor, memory, and software code stored in the memory and executable by processor. This software allows the present invention to perform many of the actions described in this invention, such as monitoring sensor data and controlling aspect of the engine such as gear shifting and engine throttle.

Typically, the throttle input 14 is configured to control the power output of the engine 100. The engine 100 is then connected to the transmission. The throttle input 14 allows the user to send an input throttle signal to the ECU and then the engine to supply power to its output into the transmission's gearbox. The throttle input 14 may also be any mechanism known to those skilled in the art, such as a pedal, push button, or crank.

A gearbox of the transmission may be connected to the output of the engine (e.g., crank shaft) and may provide different gear ratios and directions at the output of the transmission. In other words, the engagement of a gear, or a combination of gears in various gear ratios, results in power from the engine to be translated into varying amounts of rotational energy that is further transferred to a mechanism that utilizes rotational energy. In that respect, the gearbox of a transmission contains at least one gear, and typically multiple gears configured to engage each other to produce different rotational speeds and directions of the transmission's output. The mechanism that utilizes the rotational energy of the transmission's output can be any number of mechanisms such as drive shafts, wheels, drill heads, or similar mechanisms.

As seen in FIG. 4, the ECU 108 is in communication and control with the gear position sensor 106 and the shifting assembly 102. The user can select a desired gear with a transmission selector 12 that is in communication with the ECU 108. The transmission selector 12 may be any mechanism known by those skilled in the art, such as lever, push button, or pedal, and can transmit or communicate an electronic gear input signal to the controller indicating a desired gear to be shifted to. The transmission selector 12 controls, via the ECU 108, the position of the gear shifting assembly 102. For example, the ECU 108 may be connected to a motor that controls the position of the shift selector cable 102C which then moves the gear selector lever 102A and thereby rotates the axle 102B to adjust the gear engaged by the engine 100.

The ECU 108 changes gears in accordance with the user input via the transmission selector 12. The ECU can adjust gears either by automatic or manual means, for example automatically selecting the appropriate gear ratio depending on the situation or requiring the user to select the gear ratio that is appropriate to the situation. For example, an automatic gear selection mechanism might have following gear selections:

| P | Park |
| D | Drive (microprocessor controller will select between high gear and low gear depending on the situation) |
| R | Reverse |
| N | Neutral |

On the other hand, a manual gear selection mechanism might have the following gear selections:

| P | Park |
| H | High Gear |
| L | Low Gear |
| R | Reverse |
| N | Neutral |

When the user decides to change the gear, the user selects the desired gear using the transmission selector 12. The ECU 108 receives a gear input signal from the transmission selector 12 and instructs the gear shifting assembly 102 to change to the desired gear. In one example embodiment, the gear selector lever 102A is an arm that rotates about a 360° axis of the axle 102B, both of which rotate together. Hence, the gear selection lever 102A specifies the desired gear based upon its rotational angle. After the gear selection lever has selected the appropriate gear, the user then applies throttle. When throttle is applied, the engine transfers rotational power to the transmission through the selected gear, moving the vehicle in the desired direction (and optionally driving any other components connected to the transmission).

If the gear shift has not completed when the user applies throttle, the gears will not be in proper alignment. This situation can occur because gear shifting is a mechanical process that occurs quickly, but not instantaneously. This can especially be the case for continuously variable transmissions. So, it is possible for gears not to be in alignment when the user wants to apply throttle. This situation most commonly happens when the user applies the throttle too quickly following gear selection. The user may be alerted to the fact that gears will not be in alignment due to a grinding noise resulting the misaligned gears grinding against each other. Damage to the gears and gearbox mechanisms can also result from misaligned gears grinding against each other.

This invention overcomes the problems described above, by allowing the ECU 108 to limit the throttle signal received by the engine to zero (or a relatively low level) when in a "dead zone" between engaged drive gears, as well as optionally when in a neutral gear.

Figure 5:
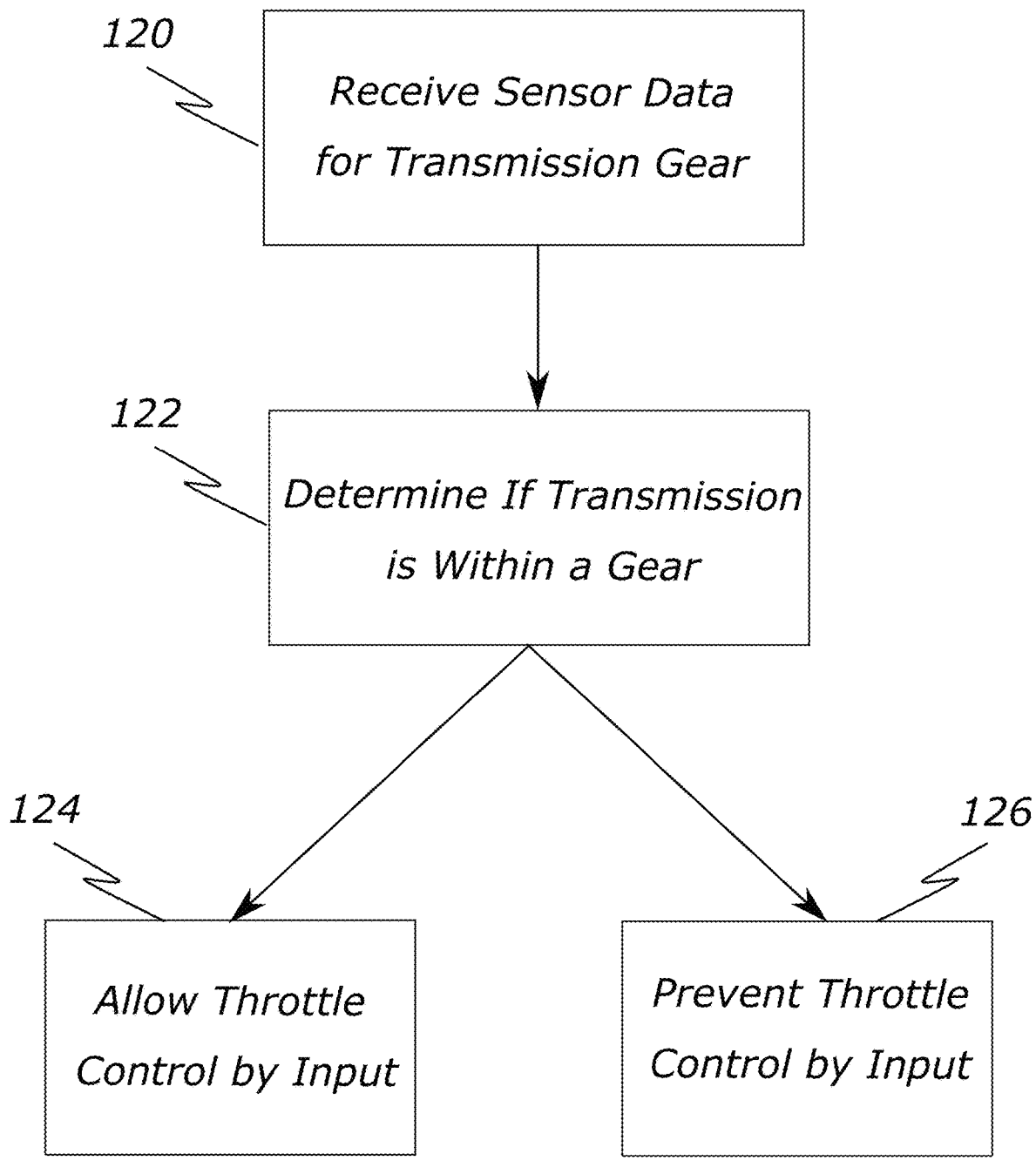
FIG. 5 is a flow chart illustrating ECU control of a throttle based on transmission gear sensor data.

The method of operation of this improved transmission system is further described in FIG. 5. First, the vehicle 10 is powered on in an operational mode, as known in the art. In this respect, the ECU 108 is also activated so that it is executing its stored software and receiving data from sensors in the vehicles 10.

Next, in step 120, the gear position sensor 106 provides gear position sensor data (e.g., analog voltages) to the ECU 108 which communicates the position of the shifting assembly 102 which thereby corresponds to a drive gear the engine is engaged in. Again, in one example, the gear position sensor 106 is a rotary position sensor that senses a rotary position of the axle 102B, shift drum, or similar rotatably movable component of the shifting assembly 102.

Next in step 122, the ECU 108 determines if the shifting assembly is positioned at a location corresponding to a gear or to a "dead zone" between gears. In this respect, the ECU 108 may store predetermined ranges that correspond to each gear, dead zone, or both. If the gear position sensor 106 provides analogue sensor data (e.g., voltages), certain voltages ranges may be stored in memory that correspond to certain gears or dead zones. Hence, when the ECU 108 receives sensor data from the gear position sensor 106, the ECU 108 may compare that data to the stored sensor value ranges, allowing it to determine a position.

If the sensor data (e.g., analog voltage) is within a range indicating that a specific gear is engaged, then the ECU 108 allows throttle to be applied to the engine 100 based on the user's input via the position of the throttle input 14, as seen in step 124. For example, the ECU 108 may actuate an electric motor or actuator that adjusts physical throttle settings in the engine 100. Conversely, if the sensor data is within range of a dead zone, then the ECU 108 prevents any user input via the position of the throttle input 14 from being conveyed to the engine (e.g., the throttle is effectively set to a minimum idle level, such as a low predetermined RPM level at or near a level associated with little or no throttle input from the user or a zero throttle input state).

The ECU 108 may check the position of the gear position sensor 106 constantly, periodically (e.g., every 0.2 seconds), or a position check may be triggered by changes in sensor data.

As previously discussed, the gear position sensor 106 may be a rotary position sensor (or similar sensor) that senses a rotation position of a component of the gear shifting assembly 102, such as a gear selector drum, axle 102B, or other rotationally movable components in the assembly 102. Table 1 illustrates example voltage values that correspond to the gears of the engine 100 in such an example. Specifically, the table provides example voltage ranges (Low Voltage to High Voltage) or an in-gear differential range above or below a nominal gear voltage value. These voltage ranges indicate the rotational angle of the pin of the gear selector drum in the gear box, and therefore which gear the gear selector drum is physically engaged with. Also included are example percentages of each dead zone relative to a 360-degree circumference that the pin of the pin selector drum can travel.

TABLE 1

| Gear Position | Rotation Angle | Nominal Voltage | In-Gear Range+/− | In Gear Low V | In Gear High V |
|---|---|---|---|---|---|
| P | 103.37° | 1.578 | 0.12 | 1.458 | 1.698 |
| R | 149.35° | 2.146 | 0.12 | 2.026 | 2.266 |
| H | 180.00° | 2.525 | 0.12 | 2.405 | 2.645 |
| N | 210.65° | 2.904 | 0.12 | 2.784 | 3.024 |
| L | 256.63° | 3.472 | 0.12 | 3.352 | 3.592 |

In the same example, Table 2 illustrates example voltage ranges of "dead zones" between gears, including a low voltage value and a high voltage value of a given range. Also included are example percentages of each dead zone relative to a 360 degree circumference that the pin of the pin selector drum can travel. As with Table 1, the values in Table 2 are for illustrative purposes and those with ordinary skill in the art can utilize any range of voltages to determine the dead zones, so long as the voltage range for a dead zone does not overlap with a voltage range for a gear setting. The correspondence between the dead zones and voltages can be set at the factory or customized by the user.

TABLE 2

| Dead Zones | | | |
|---|---|---|---|
| Low Voltage | Nominal Voltage | High Voltage | |
| 0 | 1 | 1.457 | 29% |
| 1.699 | 2.205 | 0.326 | 7% |
| 2.267 | 2.404 | 0.137 | 3% |
| 2.646 | 2.783 | 0.137 | 3% |
| 3.025 | 3.351 | 0.326 | 7% |
| 3.593 | 5 | 1.407 | 28% |

Figure 6:
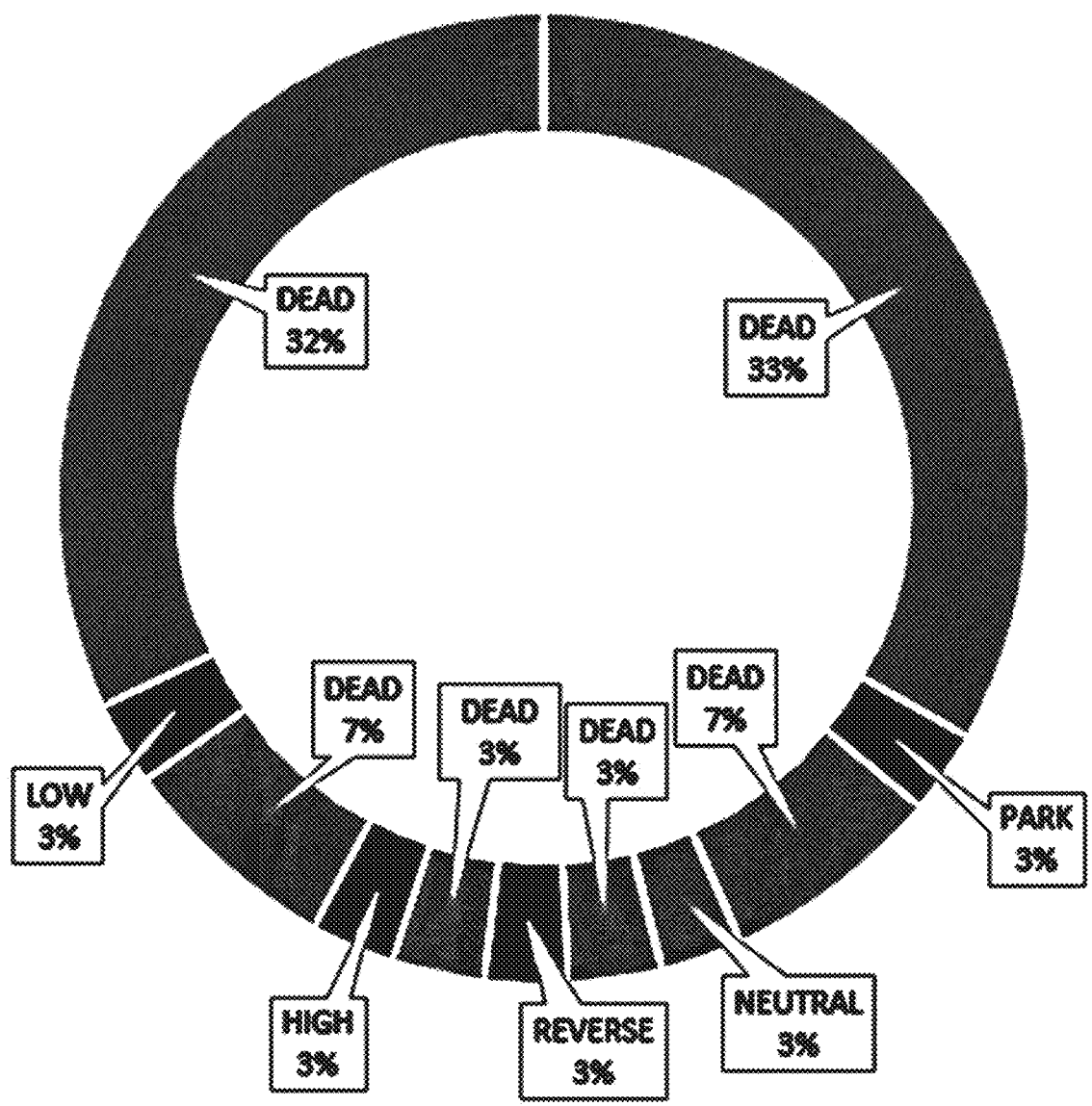

FIG. 6 is a visual depiction of rotational ranges of the measured component of the gear shifting assembly 102 in the form of example percentages relative to a 360-degree circumference that the pin of the pin selector drum can travel. As discussed in the foregoing, the "dead zones" represent the voltages supplied by the gear position sensor 106 when the transmission is not physically engaged with a gear.

Based on comparing the voltage of the gear position sensor 106 to these ranges, the control system is able to determine if the transmission is fully engaged with a gear or in a dead zone where the gears are not properly aligned.

After the user selects a desired gear, the user generally applies throttle so that the engine can supply power to the wheels or other driven component. Whether or not the throttle is actually applied is determined by results of the comparison of the voltage of the analog input to the present voltage ranges.

If the voltage of the analog input is within the voltage range specified by the gear that the user selected, the ECU 108 determines that the gears are in proper alignment. With the gears in proper alignment, the control system allows the throttle controls from the user to be communicated to the engine.

However, if the voltage from the gear position sensor 106 is outside of the voltage range for a gear that the user selected, the control system determines that the gears are in a dead zone or are not properly aligned. In this situation, the throttle is set to zero, and engine is prevented from supplying any power regardless of the user's input to the throttle.

For example, in a situation that uses the values in Tables 1 and 2 above, the user selects gear R. The pin on the gear selector drum moves into place with a rotation angle of 149.35°. At a rotation angle of 149.35°, the output voltage of the sensor 106 has a value of 2.146V. The control system receives the sensor voltage output and compares it to the series of voltage ranges presented in Table 1. According to Table 1, the voltage of 2.146V, falls within the range of 2.026-2.266V, which is the voltage range of the R gear. By making this comparison, the ECU 108 determines that the sensor voltage is within the range for the R gear, which is the gear that the user selected, so the gears are properly aligned in accordance to the gear selected by the user. So, when the user applies throttle, the engine is permitted to supply power.

Continuing with the example, the user then shifts from the R gear to the L gear, but the sensor voltage is measured at 3.593V by the gear position sensor 106. When the control system compares this voltage with the series of voltages in Table 1, the control system determines that the voltage is outside of the voltage range for the L gear. According to Table 2, the analog input's voltage of 3.593 is in a voltage range that has been defined as a dead zone. Thus, the ECU 108 determines that the gears are in a dead zone or are not properly aligned based upon the voltage of the sensor 106. As a result, the throttle is set to zero or a minimum value, and if the user applies throttle, the ECU 108 will not convey those commands to the engine 100.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A transmission shifting system configured for use with a transmission of a vehicle, comprising:
   a transmission selector configured to shift between a plurality of gears for changing a desired power output between an engine and a drive shaft of the vehicle;
   a gear position sensor configured to sense and communicate via a gear position signal whether the transmission is 1) engaged with one of the plurality of gears or 2) disengaged and in a dead zone between one or more of the plurality of gears; and,
   an electronic control unit configured to receive a gear input signal from the transmission selector, receive the gear position signal from the gear position sensor;
   and receive an input throttle signal from a throttle input;
   wherein the electronic control unit is further configured to:
   switch between a first state and a second state each time the gear position signal indicates that the transmission is disengaged from and in the dead zone between one or more of the plurality of gears, and switch between the second state and the first state each time the gear position signal indicates that the transmission is engaged with one of the plurality of gears;
   in the first state, limit the input throttle signal to a zero-input throttle state so that any user command to the throttle input to increase the input throttle signal will not be conveyed to the engine; and in the second state, communicate the input throttle signal to the engine so that any user command to the throttle input to increase the input throttle signal will be conveyed to the engine.

2. The transmission shifting system of claim 1, wherein the gear position sensor is a rotary position sensor that senses a rotational position of a component of a gear shifting assembly of the engine.

3. The transmission shifting system of claim 2, wherein the transmission selector comprises a shift selector cable connected to a gear selector lever; and wherein the gear selector lever is connected to the component of the gear shifting assembly so as to change the rotational position of the component.

4. The transmission shifting system of claim 3, wherein the electronic control unit measures an analog voltage from the gear position sensor and compares the analog voltage to a plurality of predetermined voltage ranges corresponding to dead zones.

5. The transmission shifting system of claim 3, wherein the electronic control unit is configured to limit the input throttle signal from the throttle input when the gear input signal indicates that the gear selector lever is shifted to neutral.

6. The transmission shifting system of claim 1, wherein the engine is configured for shift by wire, throttle by wire, and/or a continuously variable transmission.

7. An electronic control unit for a vehicle, wherein the electronic control unit is configured execute software to perform the following:
receive a gear position signal from a gear position sensor of a transmission;
receive an input throttle signal from a throttle with a controller; and,
switch from a first state to a second state upon determining, from the gear position signal, that the transmission is disengaged from a plurality of gears of the transmission, and switch from the second state to the first state upon determining, from the gear position signal, that the transmission is engaged with one of the plurality of gears;
in the first state, limit the input throttle signal to a zero-input throttle state so that any user command to the throttle to increase the input throttle signal will not be conveyed to an engine of the vehicle; and
in the second state, communicate the input throttle signal to the engine so that any user command to the throttle to increase the input throttle signal will be conveyed to the engine.

8. The electronic control unit of claim 7, wherein the electronic control unit is further configured to limit the input throttle signal if the gear position signal indicates that the transmission is in neutral.

9. The electronic control unit of claim 7, wherein the electronic control unit is further configured to limit the input throttle signal if the gear position signal indicates that the transmission is in a dead zone between gears.

10. The electronic control unit of claim 7, further comprising a shifting assembly including a shift selector cable connected to a gear selector lever located on the transmission.

11. The electronic control unit of claim 10, wherein the gear position sensor is a rotary position sensor that senses a rotational position of the gear selector lever.

12. The electronic control unit of claim 7, wherein the electronic control unit measures an analog voltage from the gear position sensor and compares the analog voltage to a plurality of predetermined voltage ranges corresponding to dead zones.

13. The electronic control unit of claim 7, wherein the electronic control unit is configured to limit the input throttle signal from the throttle when a gear input signal from a transmission selector in communication with the electronic control unit indicates that the transmission selector is shifted to neutral.

14. The electronic control unit of claim 7, wherein the engine of the vehicle is configured for shift by wire, throttle by wire, and/or a continuously variable transmission.

15. A transmission shifting system configured for use with a transmission of a vehicle, comprising:
a shifting assembly configured to shift between a plurality of gears for changing a desired power output between an engine and a drive shaft of the vehicle;
a gear position sensor configured to transmit sensor data corresponding to a position of the shifting assembly of the vehicle;
an electronic control unit configured to receive the sensor data from the gear position sensor; and receive an input throttle signal from a throttle input;
wherein the electronic control unit is further configured to:
determine, from the sensor data, each time the transmission is disengaged from and in a dead zone between the plurality of gears, and in response switch from a first state to a second state;
determine, from the sensor data, each time the transmission is engaged with one of the plurality of gears, and in response switch from the second state to the first state;
in the first state, limit the input throttle signal to a zero-input throttle state so that any user command to the throttle input to increase the input throttle signal from the throttle input will not be conveyed to the engine; and
in the second state, communicate the input throttle signal to the engine of the vehicle so that any user command to the throttle input to increase the input throttle signal will be conveyed to the engine.

16. The transmission shifting system of claim 15, wherein the gear position sensor is a rotary position sensor that senses a rotational position of a component of the shifting assembly.

17. The transmission shifting system of claim 16, further comprising transmission selector is connected to a shift selector cable connected to a gear selector lever of the shifting assembly; and wherein the gear selector lever is connected to the component of the shifting assembly so as to change the rotational position of the component.

18. The transmission shifting system of claim 17, wherein the electronic control unit is configured to limit the input throttle signal from the throttle input when the sensor data indicates that the shifting assembly is shifted to neutral.

19. The transmission shifting system of claim 15, wherein the electronic control unit measures an analog voltage from the gear position sensor and compares the analog voltage to a plurality of predetermined voltage ranges corresponding to dead zones.

20. The transmission shifting system of claim 15, wherein the engine is configured for shift by wire, throttle by wire, and/or a continuously variable transmission.

* * * * *